July 18, 1950 — H. J. SEAMAN — 2,515,268
ROTARY SOIL-WORKING IMPLEMENT
Filed July 5, 1946 — 2 Sheets-Sheet 1
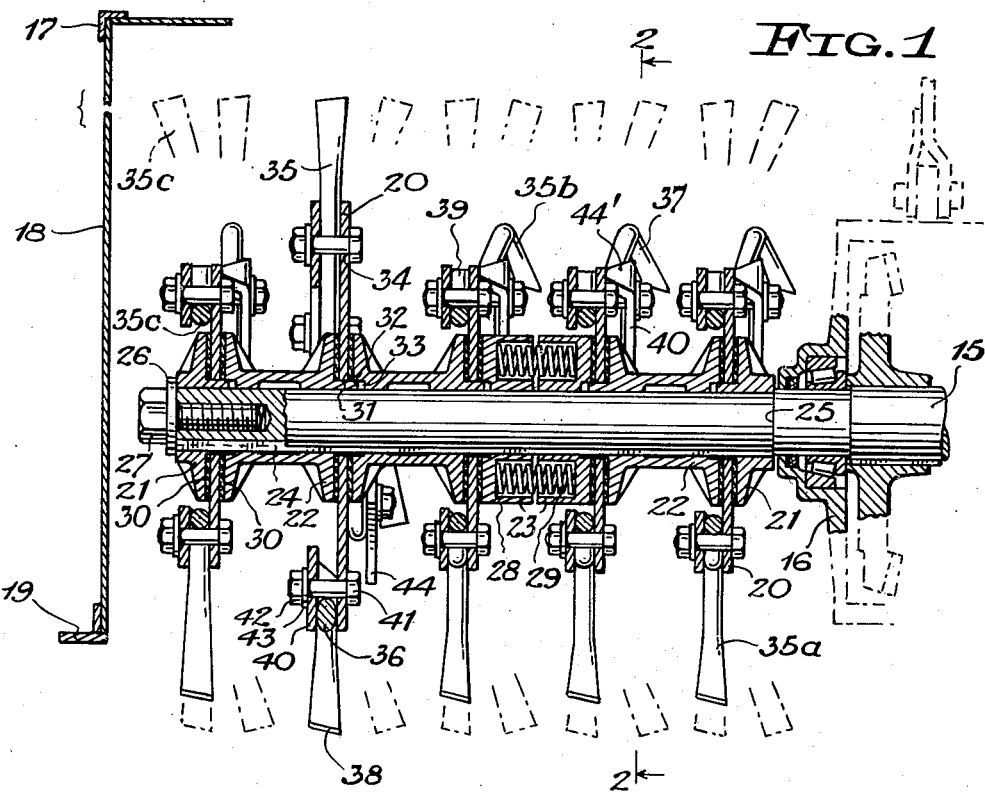
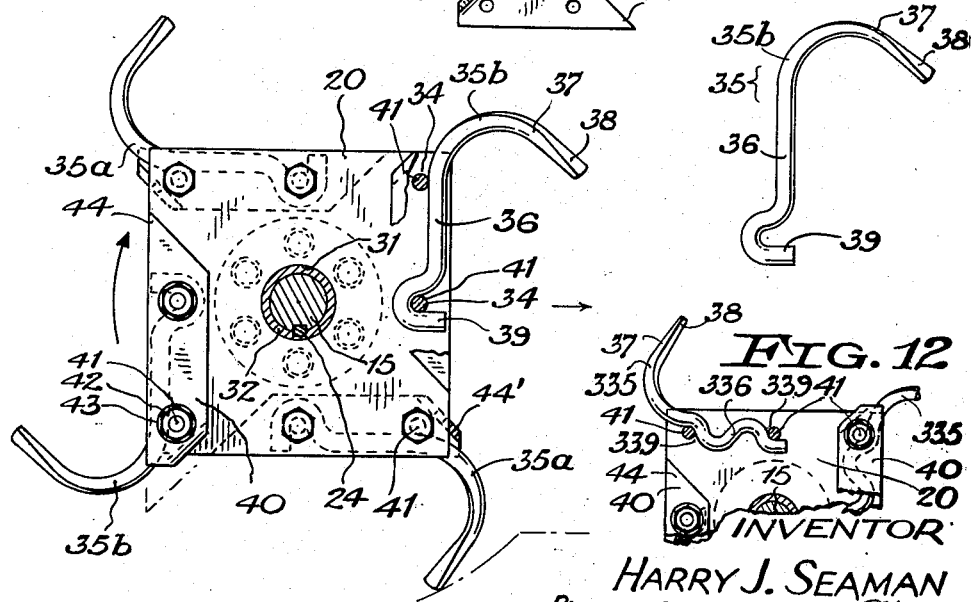
INVENTOR
HARRY J. SEAMAN
BY Christopher L. Waal
ATTORNEY July 18, 1950 H. J. SEAMAN 2,515,268
ROTARY SOIL-WORKING IMPLEMENT
Filed July 5, 1946 2 Sheets-Sheet 2
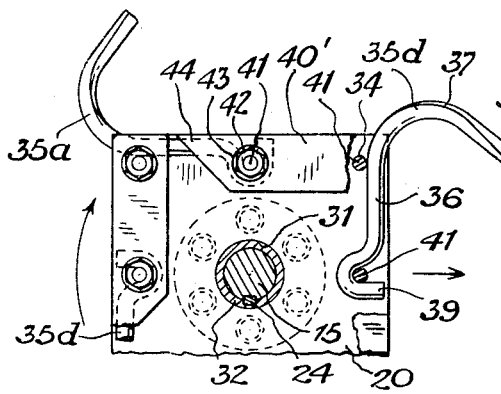
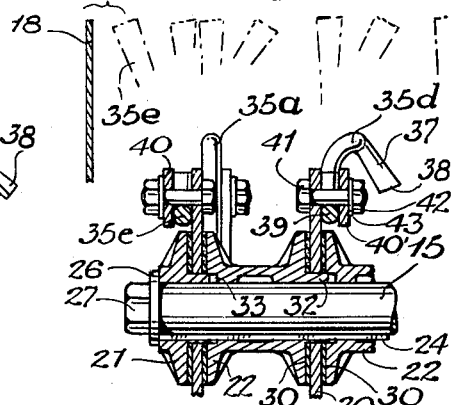
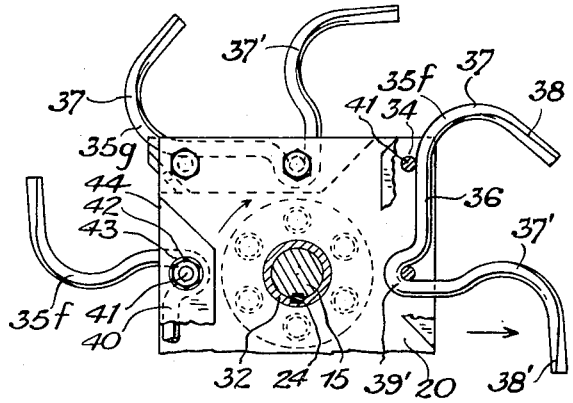
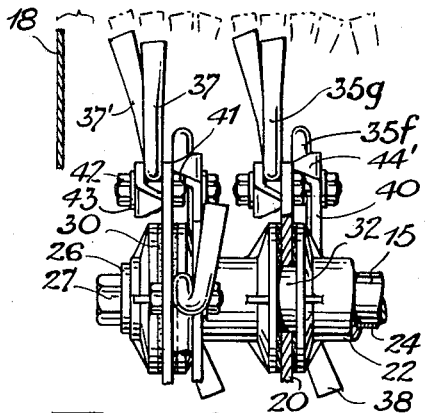
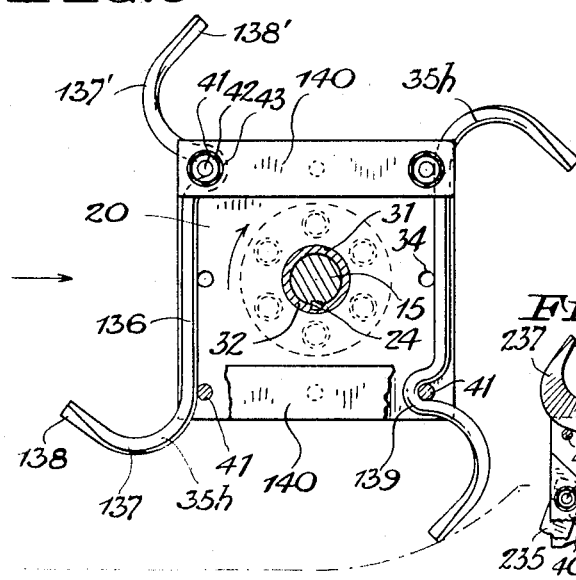
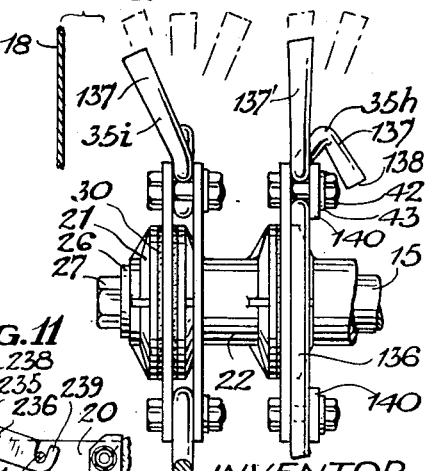
INVENTOR
HARRY J. SEAMAN
BY Christopher L. Waal
ATTORNEY Patented July 18, 1950

2,515,268

UNITED STATES PATENT OFFICE 2,515,268

ROTARY SOIL-WORKING IMPLEMENT

Harry J. Seaman, Milwaukee, Wis.

Application July 5, 1946, Serial No. 681,500

11 Claims. (Cl. 97—216)

The present invention relates to rotary implements adapted for breaking up, pulverizing, mixing, and otherwise working ground and other materials, as in soil cultivation and road building.

An object of the invention is to provide an improved rotary implement which is so constructed as to facilitate attachment and removal of soil-working tools, and to permit various arrangements of the tools.

Another object is to provide a rotary implement in which the tools are of strong and durable construction, and capable of inexpensive manufacture.

The invention further consists in the several features hereinafter described and claimed.

In the accompanying drawings, illustrating certain embodiments of the invention, Fig. 1 is a sectional rear elevational view of a rotary implement constructed in accordance with the invention;

Fig. 2 is a transverse sectional view taken generally on the line 2—2 of Fig. 1;

Fig. 3 is a detail view of one form of soil-working tool or tine;

Fig. 4 is a detail view of a clamping bar or plate for the tool;

Fig. 5 is a sectional view similar to Fig. 2, but showing an implement with tools of modified form;

Fig. 6 is a sectional rear elevational view of the implement of Fig. 5;

Fig. 7 is a sectional view similar to Fig. 2, but showing an implement with tools of another modified form;

Fig. 8 is a rear elevational view of the implement of Fig. 7, parts being shown in section;

Fig. 9 is a sectional view similar to Fig. 2, but showing an implement with tools of still another modified form;

Fig. 10 is a rear elevational view of the implement of Fig. 9, parts being shown in section;

Fig. 11 is a sectional view similar to Fig. 2, but with tools of a further modified form, and Fig. 12 is a sectional view similar to Fig. 2 and Fig. 5, but showing tools of a further modified form.

Referring to Figs. 1 to 4 of the drawings, the numeral 15 designates the rotary tool shaft of a soil-working implement. The tool shaft, which is arranged horizontally, is supported by and journalled in a gear housing 16 and is power-driven in any suitable manner. The shaft, which is here shown to be solid, but which in some instances may be tubular, projects laterally from the gear housing, preferably from opposite sides. One-half of the shaft is shown but the other half is similar. The tool shaft extends transversely of the direction of travel of the implement, the path of travel of the implement being designated by a horizontal arrow in Fig. 2, and the direction of rotation of the tool shaft being also indicated by an arrow.

A suitably supported hood 17 extends over the shaft-carrying drive housing and has opposite parallel end walls 18, one being shown, spaced a short distance from the free ends of the shaft. The lower edge of each end wall has a shoe 19.

The tool shaft carries thereon a series of axially spaced flat tool mounting plates 20 which preferably have friction clutch connections with the shaft in order to permit slipping under excessive load. In some cases, however, these plates may be rigidly secured to the shaft against relative rotation. In the present instance, the shaft carries a series of clamping or clutch members 21, 22, and 23, which are slidable axially on the shaft but are held against relative rotation with respect to the shaft, as by a spline key 24. The clutch members 21 are in the form of a pair of flanged end collars, the collar adjacent to the drive housing 16 abutting against an annular shoulder 25 on the shaft, and the collar adjacent to the free end of the shaft being confined by a washer 26 which is engaged by a bolt 27 threaded axially into the end of the shaft. The clutch members 22 are in the form of ribbed spool-shaped spacers, three being shown in the present instance. The clutch members 23 are in the form of a pair of opposed spring casings provided thereabout with a plurality of pairs of aligned cylindrical spring pockets 28 extending parallel to the shaft axis. Compressed coiled springs 29 are confined in the opposed pockets 28 to urge the casings apart. It is usually desirable to place the spring casings 23 at an intermediate point in the series of clutch members, so as to distribute accumulated wear and to equalize the spring pressure along the shaft irrespective of friction between the clutch members and the shaft. This arrangement of the spring casings also avoids excessive weight at the free end of the shaft, and permits the end wall 18 of the hood to be brought reasonably close to the outermost tool mounting plate.

The tool mounting plates 20 are interposed and engaged between the clutch members and extend at right-angles to the axis of the shaft. Preferably, each tool mounting plate is flanked by a pair of friction disks 30. By way of example, five tool mounting plates are provided at each side of the drive housing, although more may be used in machines of higher capacity. Each tool mounting plate, which is of steel or other suitable metal, is preferably square in shape and has a central circular opening 31. The plate rotatably fits on a centering boss or nipple 32 formed on one of the adjacent clutch members, the companion clutch member having a recess or counterbore 33 to receive the nipple. The opposite flat side faces of each tool mounting plate frictionally engage the friction disks 30 under the pressure of the compressed coiled springs 29, so as to permit slipping of the plate under abnormal working conditions.

Each tool mounting plate is provided near each edge portion with a row of bolt openings 34 which extend transversely through the plate, the four rows of openings forming a square pattern. In the present instance each row of openings consists of two corner openings and a central intermediate opening, although in some cases more openings may be provided.

Each mounting plate detachably carries thereon a number of angularly spaced soil-working tools or tines designated generally by the number 35 and here shown to be of three types, 35a, 35b, and 35c. Each tool is formed from a length of round bar stock, preferably of resilient steel, and has a shank portion 36 abutting against a side face of the associated mounting plate adjacent and parallel to an edge of the plate. The tool has a forwardly hooked digging or scarifying portion 37 at its rear end, this portion being flattened to a chisel-like tip 38 which extends at an angle of about 30° to the tangent at the working circle so as to be self-sharpening as it wears down. Preferably, the tip is also twisted. The front end of the tool is reversely bent to form a terminal hook or loop 39 which defines a notch opening outwardly approximately at right angles to the shank portion, the notch presenting opposed abutment-engaging shoulders. The tool is clamped between the mounting plate and a parallel clamping bar or plate 40, which is secured in place by a pair of abutment-forming bolts 41 with nuts 42 bearing on washers 43, one bolt passing through a corner opening of the mounting plate and the other passing through an intermediate opening of the mounting plate and within the notch-forming hook 39 of the tool. The tool is positioned by the hook 39 engaging the intermediate bolt and by the tool shank 36 engaging the corner bolt. The working pressure on the tool is resisted by these bolts, and the tool hook 39 also serves to keep the clamping bar or plate 40 parallel to the mounting plate. The tools may be arranged on the mounting plate in various ways, and in the present instances four tools are provided, alternate tools being disposed on opposite sides of the mounting plate. Each tool 35a has its working end in the radial plane through the shank, while the tools 35b and 35c have their working ends deflected toward opposite sides of the shank plane. The outermost mounting plate is here shown to carry all three types of tools, while the other mounting plates carry the types 35a and 35b. The paths of the tool tips are shown by broken lines in Fig. 1.

When it is desired to replace a tool, it is only necessary to loosen the nuts of the two clamping bolts, without removing the nuts or the bolts or the clamping plate, whereupon the tool can be detached by swinging it forwardly about its hooked end which turns or pivots on the intermediate bolt, and then disengaging the hooked end from the intermediate bolt, permitting the tool to be lifted off. The installation of a new tool is equally simple, the tool being inserted into the slot-forming space between the flat faces of the mounting plate and the clamping plate, and the nuts being then tightened.

In some instances, each clamping plate 40 may have a pointed end 44, as shown, permitting the clamping plates to serve as tools by reversing them on the bolts. Worn tools of the flat tine type may also serve as clamping plates. In addition to its clamping function each clamping plate also has a stiffening effect on the mounting plate. Each plate 40 has a bent end lug 44' to bear on the mounting plate near the corner bolt.

In the operation of the implement, the tool shaft 15 is driven at a suitable rate of speed, usually several hundred revolutions per minute, from a convenient source of power, such as an internal combustion engine, not shown. The entire implement is moved slowly over the ground to be worked, in the direction indicated by the straight horizontal arrow of Fig. 2, the direction of rotation of the tool shaft being such as to assist the forward movement of the implement. During rotation of the tool shaft, the tools 35 dig into the ground or other material being worked and have a cutting, pulverizing, and mixing action on the material. If any of the tools should strike stones, roots, or other obstructions in the soil, the associated mounting plate 20 will slip momentarily with respect to the flanking clutch members and thus avoid damage to the mechanism. However, the other tool mounting plates will continue to rotate.

When the implement is used in agriculture, it is often desirable to provide several sets of different tools to meet various tilling conditions. The tools may be carried on different sets of tool mounting plates, or they may be separate from the mounting plates. The tools and mounting plates can be easily and quickly changed in the field. Since the tools can be replaced on the mounting plates without removing bolts or nuts, these small parts will not become lost and but little lateral clearance space is required between the adjacent mounting plate assemblies.

The modified form of construction shown in Figs. 5 and 6 is similar to that of Figs. 1 to 4, except that the laterally bent tools, designated by 35d and 35e, have a greater angle to the plane of the mounting plate than the corresponding tools 35b and 35c of Fig. 1, and the several tools for each mounting plate, except the outermost plate, are carried on one side of the plate, preferably the side facing the gear housing. The tools are engaged by clamping plates 40 and 40'.

In the modified form of implement shown in Figs. 7 and 8, the tilling tools, designated by 35f and 35g, each have a shank portion 36, forwardly hooked soil-working portions 37 and 37' at opposite ends with flattened tips 38 and 38', and a looped intermediate portion 39' corresponding to the hooked or looped portion 39 of the tools of Fig. 2. The opposite cutting ends of each tool preferably have different paths of travel, as by laterally bending one of the end portions of the tool. The construction of the implement is otherwise similar to that of Figs. 1 and 2.

In the modified form of implement shown in Figs. 9 and 10, the tilling tools, designated by 35h and 35i, each have a shank portion 136, forwardly hooked soil-working portions 137 and 137' at opposite ends, and a looped notch-forming intermediate portion 139 similar to the looped portion 39' of Fig. 7, but engaging a corner bolt of the mounting plate. Each mounting plate 20 has two tools on one side of the plate, and the tools are secured by a pair of flat clamping plates or bars 140 which extend along opposite edges of the mounting plate crosswise of the two tools, each clamping plate being secured by the adjacent corner bolts. Each tool has flattened cutting tips 138 and 138' which preferably have different paths of travel, as by laterally bending one of the working ends. The tools and the clamping bars have a stiffening effect on the mounting plates. Instead of arranging the clamping plates 140 crosswise of the tool shanks they may be placed parallel to the tool shanks as in Fig. 5.

In the modified form of implement shown in Fig. 11, the tilling tools 235 are formed of flat bar stock like that of the clamping plates 40, and each has a shank portion 236 and a forwardly hooked soil-working portion 237 with a chisel-like tip 238. The front end portion of each tool is notched at 239 to form an outwardly opening hook receiving one of the intermediate clamping bolts 41, and the edge of the tool shank rests on a corner bolt, the arrangement being similar to that of Figs. 1 and 2. The tool is detachably clamped to a side face of the mounting plate by a clamping plate 40 and associated bolts 41, as in Figs. 1 and 2. The soil-working ends of the tools 235 are disposed in various angular positions, like the tools 35a to 35e.

In the modification of Fig. 12, each tool 335 has a sinuous shank 336 presenting positioning recesses or notches 339 to bear on the two associated clamping bolts 41, the plane of the sinuous shank being parallel to the mounting plate 20 and clamping plate 40. If desired, the lug of the clamping plate may be omitted. The construction is otherwise similar to that of Fig. 2 or Fig. 5. The sinuous shank 336 presents an extended bearing surface for the clamping plate, and the shoulder-forming notches or recesses 339 can be relatively shallow.

What I claim as new and desire to secure by Letters Patent is:

1. In a rotary implement, a rotatable mounting member having a side face, a pair of spaced bolts projecting from said side face, a tool member detachably engaging said side face and having a material-working portion projecting outwardly from said mounting member, said tool member bearing on said bolts and having a notch receiving one of said bolts, and means including said bolts for detachably clamping said tool member to said mounting member.

2. In a rotary implement, a rotatable mounting member having a side face, a pair of bolts projecting from said side face, a tool member detachably engaging said side face and having a material-working portion projecting outwardly from said mounting member, said tool member bearing on said bolts and having a notch receiving one of said bolts, and means for detachably securing said tool member to said mounting member comprising a clamping plate connecting said bolts, the loosening of the clamping engagement permitting said tool member to be withdrawn from the space between said mounting member and clamping plate.

3. In a rotary implement, a rotatable mounting member having a side face, a pair of peripherally spaced bolts projecting from said side face, a tool member detachably engaging said side face and having a material-working portion projecting outwardly from said mounting member, said tool member engaging the inner side of the forward bolt and the outer side of the rearward bolt and having a notch receiving one of said bolts, and means including said bolts for detachably clamping said tool member to said mounting member.

4. In a rotary implement, a rotatable mounting member having a side face, a pair of peripherally spaced bolts projecting from said side face, a tool member detachably engaging said side face and having a material-working portion projecting outwardly from said mounting member, said tool member bearing on the outer side of the rearward bolt and on the inner side of the forward bolt and having an outwardly opening notch receiving the forward bolt, and means including said bolts for detachably clamping said tool member to said mounting member.

5. In a rotary implement, a rotatable mounting member, a clamping member at a side of said mounting member, a tool member having a portion interposed between said members and provided with a notch, and attaching means connecting said mounting member and clamping member and comprising a pair of fastening members one of which extends in said notch and the other of which forms an abutment for said tool member.

6. In a rotary implement, a rotatable mounting member having a side face, a pair of peripherally spaced bolts projecting from said face, a tool member engaging said side face and having a material-working portion at its rear portion and an outwardly opening notch at its front end, said tool member bearing on said bolts and the forward bolt engaging in said notch, and means including said bolts for detachably clamping said tool member to said mounting member.

7. In a rotary implement, a rotatable mounting member having a side face, a pair of peripherally spaced bolts projecting from said face, a tool member engaging said side face and having material-working portions at opposite ends and an outwardly opening notch adjacent to the forward material-working portion, said tool member bearing on said bolts and the forward bolt engaging in said notch, and means including said bolts for detachably clamping said tool member to said mounting member.

8. In a rotary implement, a tool member adapted to be clamped to the side face of a rotatable support, comprising a length of flat bar stock of elongated cross-section adapted to abut flatwise against said side face and rotatable edgewise, said tool member having a material-working portion at one end and a notch at the other end opening at the outer edge of the tool member and adapted to receive an abutment member.

9. In a rotary implement, a rotatable mounting plate of generally square shape, bolts at the corner portions of said plate projecting laterally from said plate, a pair of tool members having portions bearing laterally against said plate and extending along opposite side edges of said plate, each tool member bearing against a pair of adjacent corner bolts and having a notch receiving one of said bolts, and each tool member further having material-working portions at opposite ends, and means for clamping said tool members to said plate comprising clamping members engaging said bolts.

10. In a rotary implement, a rotatable mounting member having a side face, a clamping member at a side of said mounting member, a tool element having a shouldered shank portion interposed between said side face and said clamping member, abutment members for said tool element disposed between said members and spaced to permit passage of said shouldered shank portion, and screw means securing said clamping member to said mounting member to clamp said tool element between said members, the loosening of said screw means enlarging the space between said members to a width slightly larger than the thickness of said tool element to permit release of said tool element from said abutment members and outward withdrawal of said tool element.

11. In a rotary implement, a rotatable mounting member having a side face, a clamping member at a side of said mounting member, a tool element having a shank portion interposed between said side face and said clamping member, a pair of abutments disposed between said members and peripherally spaced with respect to said mounting member, the spacing of said abutments affording a passage for said shank portion, said shank portion engaging the outer side of the rearward abutment and having a shoulder-forming notch receiving said forward abutment and engaging the inner side of said forward abutment, and screw means securing said clamping member to said mounting member to clamp said tool element between said members, the loosening of said screw means enlarging the space between said members for a width slightly larger than the thickness of said tool element to permit release of said tool element from said abutments and withdrawal of said tool element.

HARRY J. SEAMAN.

REFERENCES CITED

The following references are of record in the file of this patent:

UNITED STATES PATENTS

| Number | Name | Date |
| --- | --- | --- |
| 2,070,830 | Gravely | Feb. 16, 1937 |
| 2,154,840 | Gard | Apr. 18, 1939 |